US010567962B1

(12) United States Patent
Lu

(10) Patent No.: US 10,567,962 B1
(45) Date of Patent: Feb. 18, 2020

(54) SYSTEMS AND METHODS FOR CONNECTING INTERNET-CONNECTED DEVICES TO WIRELESS ACCESS POINTS

(71) Applicant: Symantec Corporation, Mountain View, CA (US)

(72) Inventor: Jin Lu, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 224 days.

(21) Appl. No.: 14/850,985

(22) Filed: Sep. 11, 2015

(51) Int. Cl.
*H04W 12/06* (2009.01)
*H04L 29/06* (2006.01)
*H04W 12/08* (2009.01)
*H04W 76/14* (2018.01)
*H04W 88/08* (2009.01)
*H04W 88/02* (2009.01)

(52) U.S. Cl.
CPC ........... *H04W 12/08* (2013.01); *H04W 12/06* (2013.01); *H04W 76/14* (2018.02); *H04W 88/02* (2013.01); *H04W 88/08* (2013.01)

(58) Field of Classification Search
CPC ..... H04W 12/08; H04W 12/06; H04W 76/02; H04W 88/02
See application file for complete search history.

(56) References Cited

U.S. PATENT DOCUMENTS

| | | | |
|---|---|---|---|
| 2005/0198534 A1* | 9/2005 | Matta ...................... | G06F 21/31 726/5 |
| 2008/0175187 A1* | 7/2008 | Lowry .................. | H04W 48/14 370/328 |
| 2013/0214909 A1* | 8/2013 | Meijers ................. | H04W 4/008 340/10.5 |
| 2014/0282929 A1* | 9/2014 | Tse .......................... | H04L 63/08 726/5 |
| 2015/0100618 A1* | 4/2015 | Le Guen ................ | H04W 4/70 709/201 |
| 2016/0226842 A1* | 8/2016 | Mower ............... | H04L 63/0492 |

OTHER PUBLICATIONS

"Netgear N450 Wireless Router", http://www.downloads.netgear.com/files/GDC/WNR2500/WNR2500_DS_NA_14Aug13.pdf, as accessed Aug. 3, 2015, Data Sheet, WNR2500, (2013).

(Continued)

*Primary Examiner* — Wasika Nipa
(74) *Attorney, Agent, or Firm* — FisherBroyles, LLP

(57) ABSTRACT

The disclosed computer-implemented method for connecting Internet-connected devices to wireless access points may include (1) receiving, over the Internet from a client device at a server, a request to connect the client device to an access point that is secured by a passcode, (2) transmitting a verification-request message from the server to the access point and/or the client device that instructs the access point and/or the client device to perform an action that enables the physical proximity of a user of the client device to the access point to be verified, (3) receiving a verification-response message that indicates that the user of the client device has physical access to the access point, and (4) enabling the client device to connect to the access point by transmitting, from the server to the client device, the passcode. Various other methods, systems, and computer-readable media are also disclosed.

19 Claims, 9 Drawing Sheets

(56) References Cited

OTHER PUBLICATIONS

"Netgear N300 Wireless Router", http://vvww.downloads.netgear.com/files/WNR2200_IG_28SEPT2011.pdf, as accessed Aug. 3, 2015, Installation Guide, WNR2200, (Sep. 2011).
"Why does eero have Bluetooth?", https://support.eero.com/hc/en-us/articles/204027385-Why-does-eero-have-Bluetooth-, as accessed Aug. 3, 2015, (Feb. 2, 2015).
"[Unbound-users] DNS multiplexer?", http://unbound.net/pipermail/unbound-users/2010-Aug./001323.html, as accessed Aug. 3, 2015, (Aug. 11, 2010).

* cited by examiner

SYSTEMS AND METHODS FOR CONNECTING INTERNET-CONNECTED DEVICES TO WIRELESS ACCESS POINTS

BACKGROUND

Convenience and security are two important (albeit sometimes conflicting) aspects of wireless access points. Today when a user wants to connect a client device (e.g., a smartphone) to a wireless access point, the user may need to know the Service Set Identifier (SSID) and passcode (e.g., a shared key such as a password or passphrase) of the wireless access point. As a way of enabling users to conveniently connect to wireless access points, some vendors print the SSIDs and passcodes of wireless access points on labels affixed to the back or bottom of the wireless access points such that a user can acquire the SSID and passcode of a wireless access point by simply reading them from the back or bottom of the wireless access point.

Unfortunately, this common method of providing SSIDs and passcodes to users may be insecure, as anyone with temporary access to a wireless access point may obtain its SSID and passcode. For example, anyone with a smart phone may scan or take a picture of a wireless access point's label and be able to later join the wireless access point. The instant disclosure, therefore, identifies and addresses a need for improved systems and methods for connecting Internet-connected devices to wireless access points.

SUMMARY

As will be described in greater detail below, the instant disclosure describes various systems and methods for connecting Internet-connected devices to wireless access points when the Internet-connected devices do not yet have the SSIDs and passcodes of the wireless access points. In one example, a computer-implemented method for connecting Internet-connected devices to wireless access points may include (1) receiving, over the Internet from a client device at a server that is remote from the client device, a request to connect the client device to an access point that is local to the client device and secured by a passcode to which the server has access, (2) transmitting a verification-request message from the server to the access point and/or the client device that instructs the access point and/or the client device to perform an action that enables the physical proximity of a user of the client device to the access point to be verified, (3) receiving, from the access point and/or the client device at the server, a verification-response message that indicates that the user of the client device has physical access to the access point, and (4) enabling, in response to receiving the verification-response message, the client device to connect to the access point by transmitting, from the server to the client device, the passcode.

In some examples, the computer-implemented method may further include (1) receiving, over the Internet from the client device at the server, an additional request to secure the access point using a different passcode, (2) transmitting an additional verification-request message from the server to the access point and/or the client device that instructs the access point and/or the client device to perform an additional action that enables the physical proximity of the user of the client device to the access point to be verified, (3) receiving, from the access point and/or the client device at the server, an additional verification-response message that indicates that the user of the client device has physical access to the access point, and (4) securing, in response to receiving the additional verification-response message, the access point using the different passcode.

In some embodiments, the verification-request message may be transmitted to the access point, and the computer-implemented method may further include performing, at the access point, the action that enables the physical proximity of the user of the client device to the access point to be verified. In some embodiments, the action may include displaying an indicator that is visible to the user, and the computer-implemented method may further include verifying, via the client device, that the user viewed the indicator. In some embodiments, the action may include emitting a sound that is audible to the user, and the computer-implemented method may further include verifying, via the client device, that the user heard the sound.

In some embodiments, the verification-request message may be transmitted to the client device, and the computer-implemented method may further include performing, at the client device, the action that enables the physical proximity of the user of the client device to the access point to be verified. In some embodiments, the action may include instructing the user to provide input at the access point, and the computer-implemented method may further include verifying, via the access point, that the user provided the input.

In some embodiments, the computer-implemented method may further include (1) enabling the user to create a user account at the server and (2) associating, in response to receiving the verification-response message, the access point with the user account such that the user can use the user account to request, at an additional client device, the passcode from the server without again verifying physical access to the access point. In some embodiments, the verification-response message may include a Media Access Control (MAC) address of the client device, and the computer-implemented method may further include using, at the access point, the media access control address of the client device to control access to the access point.

In one embodiment, a system for implementing the above-described method may include (1) a request-receiving module, stored in memory, that receives, over the Internet from a client device at a server that is remote from the client device, a request to connect the client device to an access point that is local to the client device and secured by a passcode to which the server has access, (2) a transmitting module, stored in memory, that transmits a verification-request message from the server to at least one of the access point and the client device that instructs at least one of the access point and the client device to perform an action that enables the physical proximity of a user of the client device to the access point to be verified, (3) a message-receiving module, stored in memory, that receives, from at least one of the access point and the client device at the server, a verification-response message that indicates that the user of the client device has physical access to the access point, (4) an enabling module, stored in memory, that enables, in response to receiving the verification-response message, the client device to connect to the access point by transmitting, from the server to the client device, the passcode, and (5) at least one processor that executes the request-receiving module, the transmitting module, the message-receiving module, and the enabling module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, over the Internet from a client device at a server that is remote from the client device, a request to connect the client device to an access point that is local to the client device and secured by a passcode to which the server has access, (2) transmit a verification-request message from the server to the access point and/or the client device that instructs the access point and/or the client device to perform an action that enables the physical proximity of a user of the client device to the access point to be verified, (3) receive, from the access point and/or the client device at the server, a verification-response message that indicates that the user of the client device has physical access to the access point, and (4) enable, in response to receiving the verification-response message, the client device to connect to the access point by transmitting, from the server to the client device, the passcode.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
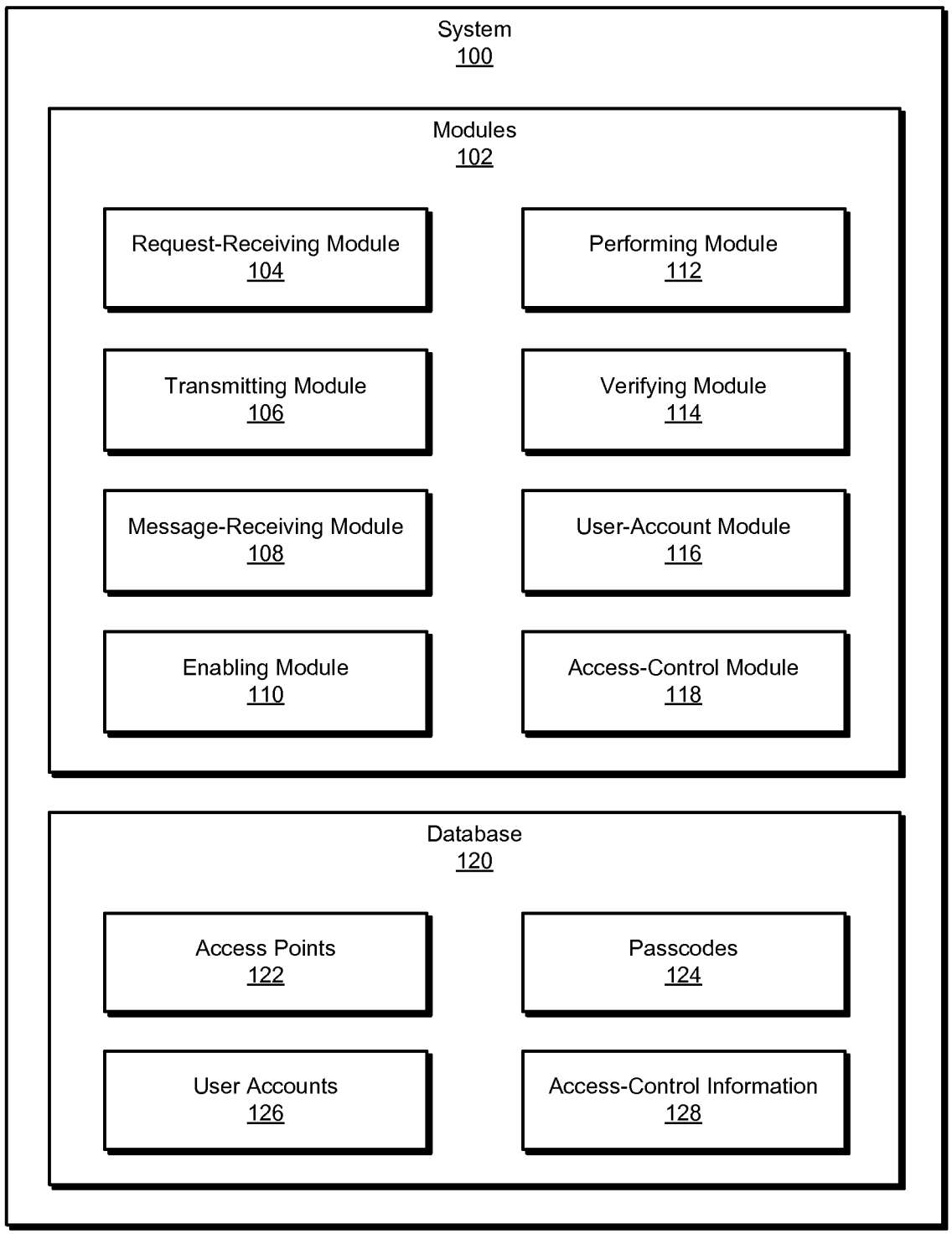
FIG. 1 is a block diagram of an exemplary system for connecting Internet-connected devices to wireless access points.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for connecting Internet-connected devices to wireless access points. As will be explained in greater detail below, by employing a backend server that is connected over the Internet to a client device and a wireless access point via separate communication channels to retrieve and/or modify configuration information at the wireless access point (e.g., passcodes or SSIDs), the systems and methods described herein may enable a user of the client device to securely retrieve and/or change the SSID and passcode of the wireless access point. For example, these systems and methods may enable a user of a smartphone to connect to a backend server over a cellular communication channel to retrieve the passcode of a wireless access point to which the user wishes to connect the smartphone. By using a backend server to provide users with the SSIDs and/or passcodes of wireless access points rather than providing the SSIDs and/or passcodes on the labels of the wireless access points, these systems and methods may enhance the security of the networks hosted by the wireless access points by preventing unauthorized entities from obtaining the SSIDs and passcodes of the wireless access points. Embodiments of the instant disclosure may also provide various other advantages and features, as discussed in greater detail below.

Figure 2:
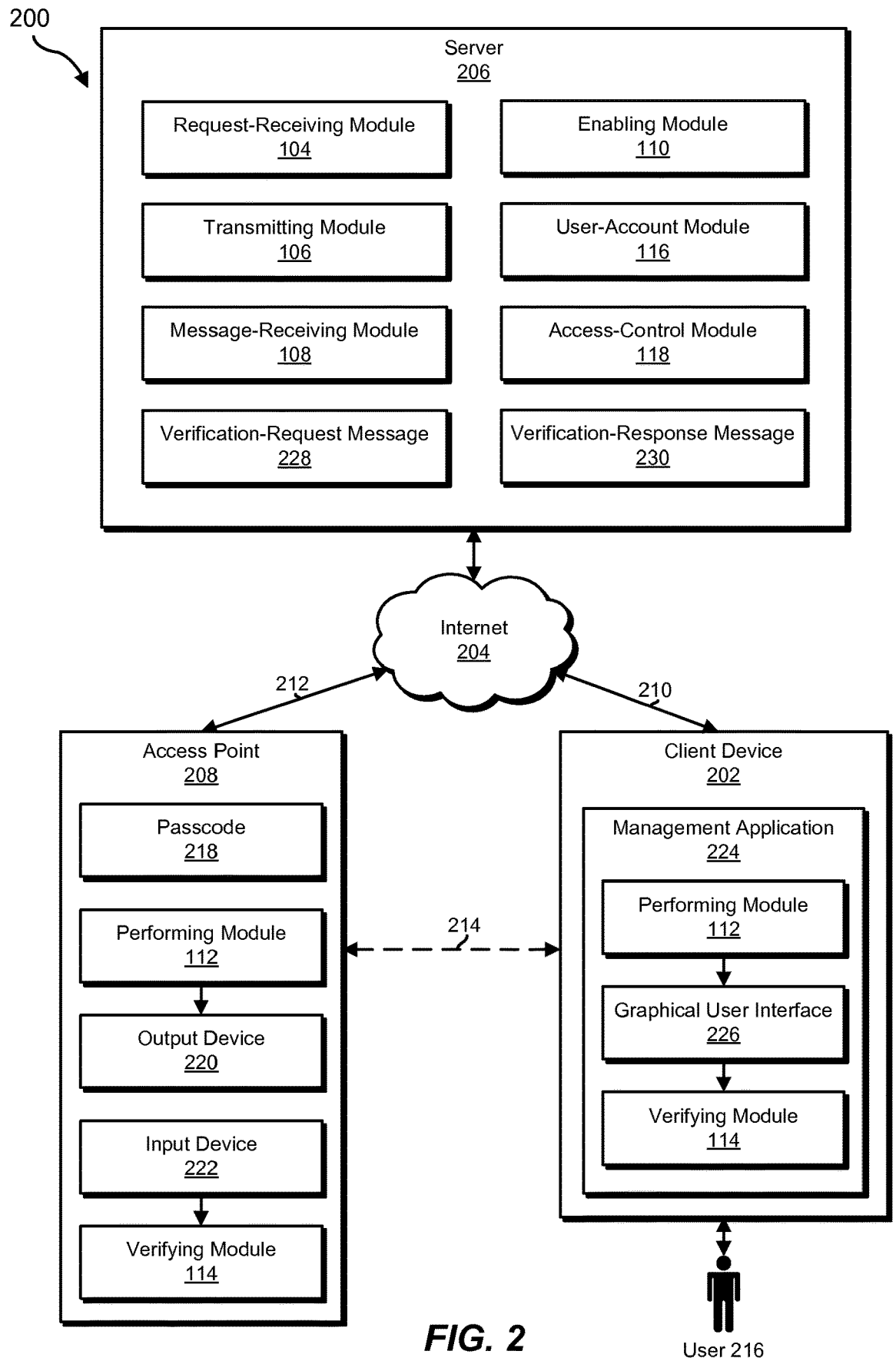
FIG. 2 is a block diagram of an additional exemplary system for connecting Internet-connected devices to wireless access points.

The following will provide, with reference to FIGS. 1-2, detailed descriptions of exemplary systems for connecting Internet-connected devices to wireless access points. Detailed descriptions of corresponding computer-implemented methods will also be provided in connection with FIGS. 3-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for connecting Internet-connected devices to wireless access points. As illustrated in this figure, exemplary system 100 may include one or more modules 102 for performing one or more tasks. For example, and as will be explained in greater detail below, exemplary system 100 may include a request-receiving module 104 that receives, over the Internet from a client device at a server that is remote from the client device, a request to connect the client device to an access point that is local to the client device and secured by a passcode to which the server has access. Exemplary system 100 may also include a transmitting module 106 that transmits a verification-request message from the server to at least one of the access point and the client device that instructs at least one of the access point and the client device to perform an action that enables the physical proximity of a user of the client device to the access point to be verified. Exemplary system 100 may also include a message-receiving module 108 that receives, from at least one of the access point and the client device at the server, a verification-response message that indicates that the user of the client device has physical access to the access point. Exemplary system 100 may further include an enabling module 110 that enables, in response to the verification-response message, the client device to connect to the access point by transmitting, from the server to the client device, the passcode.

In addition, and as will be described in greater detail below, exemplary system 100 may include a performing module 112 that performs the action that enables the physical proximity of the user of the client device to the access point to be verified. Exemplary system 100 may also include a verifying module 114 that verifies that the action has been performed. Exemplary system 100 may also include a user-account module 116 that (1) enables the user to create a user account at the server and (2) associates, in response to receiving the verification-response message, the access point with the user account such that the user can use the user account to request, at an additional client device, the passcode from the server without again verifying physical access to the access point. Exemplary system 100 may further include an access-control module 118 that uses, at the access point, a MAC address of the client device to control access to the access point. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client device 202, server 206, and/or access point 208), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include access points 122 for storing information about one or more access points, passcodes 124 for storing access-point passcodes, user accounts 126 for storing information about one or more user accounts, and access-control information 128 for storing information used to perform access control functions (e.g., MAC addresses of client devices authorized to connect to access points).

Database 120 may represent portions of a single database or computing device or a plurality of databases or computing devices. For example, database 120 may represent a portion of client device 202, server 206, and/or access point 208 in FIG. 2, a portion of computing system 810 in FIG. 8, and/or portions of exemplary network architecture 900 in FIG. 9. Alternatively, database 120 in FIG. 1 may represent one or more physically separate devices capable of being accessed by a computing device, such as client device 202, server 206, and/or access point 208 in FIG. 2, computing system 810 in FIG. 8, and/or portions of exemplary network architecture 900 in FIG. 9.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client device 202 and an access point 208 in communication with a server 206 via Internet 204. In one example, client device 202 may be programmed with one or more of modules 102 and/or may store all or a portion of the data in database 120. Additionally or alternatively, server 206 may be programmed with one or more of modules 102 and/or may store all or a portion of the data in database 120. Additionally or alternatively, access point 208 may be programmed with one or more of modules 102 and/or may store all or a portion of the data in database 120.

As shown in FIG. 2, client device 202 and access point 208 may initially be connected to Internet 204 and server 206 via connection 210 (e.g., a cellular connection) and connection 212, respectively. Initially, client device 202 may not be connected to access point 208 via connection 214 and may be unable to connect to access point 208 without passcode 218. As shown in FIG. 2, access point 208 may be secured by passcode 218, and server 206 may be capable of requesting passcode 218 from access point 208. Additionally or alternatively, server 206 may store passcode 218 at server 206. As will be explained in greater detail below, client device 202 may acquire passcode 218 via server 206 and may then connect directly to access point 208 via connection 214 using passcode 218.

In one embodiment, one or more of modules 102 from FIG. 1 may, when executed by at least one processor of client device 202, server 206, and/or access point 208, enable client device 202, server 206, and/or access point 208 to connect client device 202 to access point 208. For example, and as will be described in greater detail below, one or more of modules 102 may cause server 206 to receive, over the Internet from client device 202, a request to connect client device 202 to access point 208. One or more of modules 102 may then cause server 206 to transmit a verification-request message 228 from server 206 to access point 208 and/or client device 202 that instructs access point 208 and/or client device 202 to perform an action that enables the physical proximity of a user 216 of client device 202 to access point 208 to be verified. One or more of modules 102 may then cause server 206 to later receive, from access point 208 and/or client device 202, a verification-response message 230 that indicates that user 216 of client device 202 has physical access to access point 208. After verification-response message 230 is received, one or more of modules 102 may cause server 206 to enable client device 202 to connect to access point 208 by transmitting, from server 206 to client device 202, passcode 218.

Client device 202 generally represents any type or form of computing device capable of reading computer-executable instructions. Examples of client device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device. As shown, client device 202 may include an access-point management application 224 that (1) is capable of connecting client device 202 to access point 208, (2) is capable of configuring access point 208, and/or (3) includes a graphical user interface 226 with which user 216 of client device 202 may provide input to and/or receive output from client device 202.

Server 206 generally represents any type or form of computing device that is capable of reading computer-executable instructions. Examples of server 206 include, without limitation, application servers and database servers configured to provide various database services and/or run certain software applications.

Access point 208 generally represents any type or form of physical wireless access point that enables a computing device to wirelessly connect to a secured network. In some embodiments, access point 208 may reside within a router, switch, or other network device. In other embodiments, access point 208 may represent a separate physical device.

In some examples, access point 208 may be secured by passcode 218 and may be identified by a Service Set Identifier (SSID) that is used to (1) identify a wireless network serviced by access point 208 and (2) enable client devices to identify and connect to the wireless network. As shown in FIG. 2, access point 208 may include an output device 220 (e.g., an indicator light, a display screen, or a sound device) that may be used to provide output to a user within close physical proximity to access point 208 and an input device 222 (e.g., a button, a keypad, or a switch) that may be used to receive input from a user within close physical proximity to access point 208.

Figure 3:
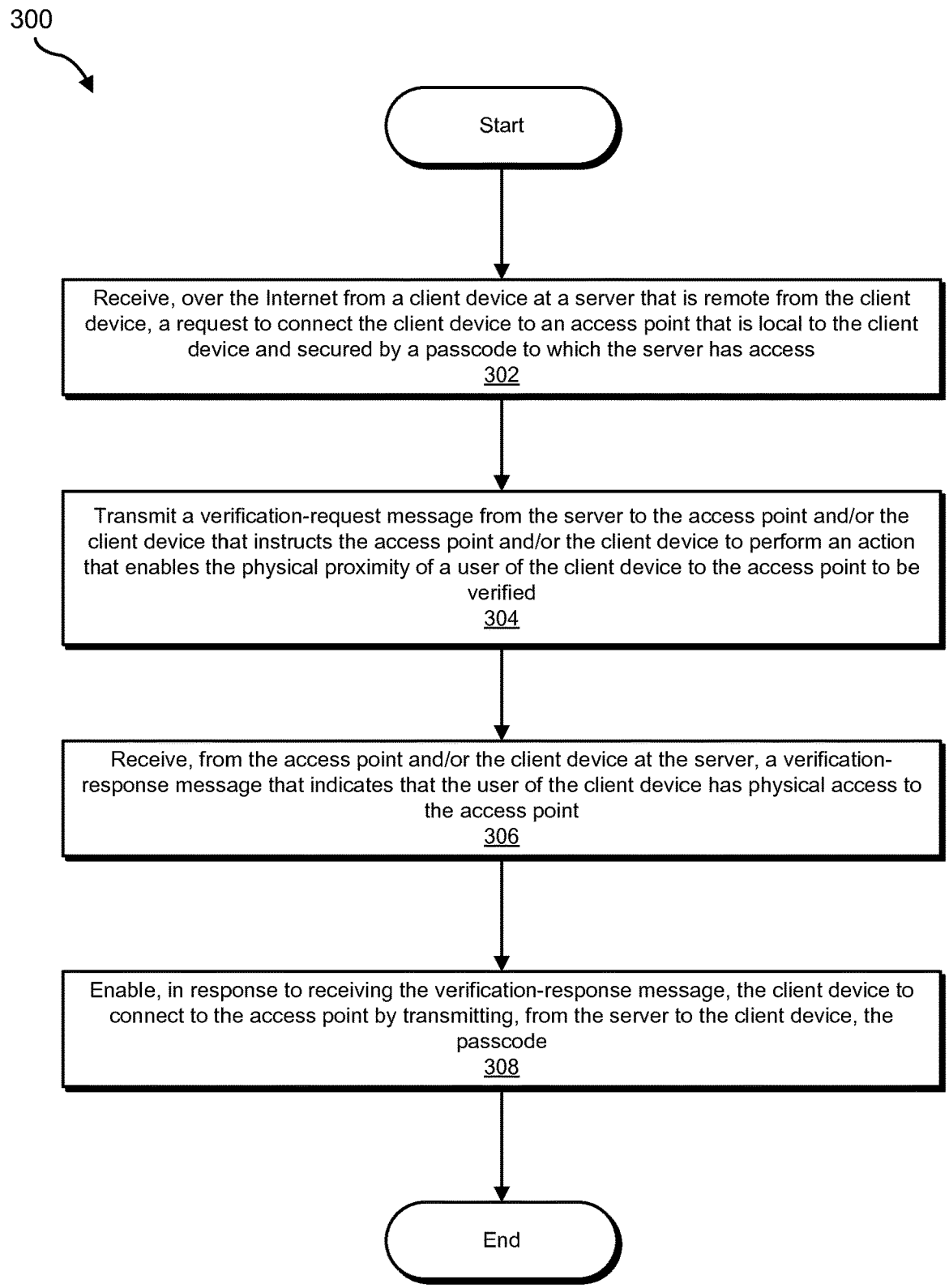
FIG. 3 is a flow diagram of an exemplary method for connecting Internet-connected devices to wireless access points.
Figure 4:
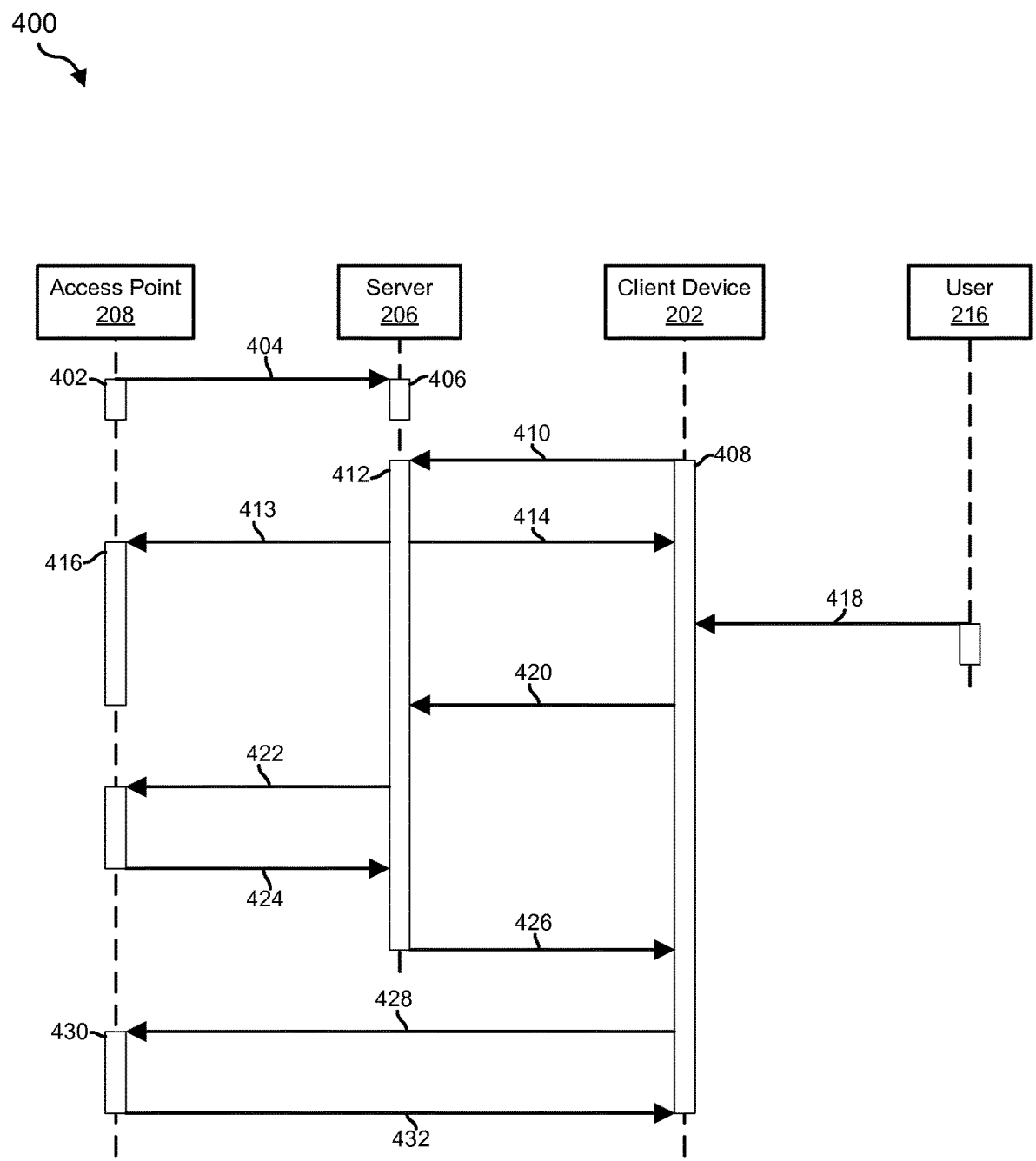
FIG. 4 is a diagram of an exemplary sequence for connecting Internet-connected devices to wireless access points.

FIG. 3 is a flow diagram of an exemplary computer-implemented method 300 for connecting Internet-connected devices to wireless access points. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may receive, over the Internet from a client device at a server that is remote from the client device, a request to connect the client device to an access point that is local to the client device and secured by a passcode to which the server has access. For example, request-receiving module 104 may, as part of server 206 in FIG. 2, receive, over Internet 204 from client device 202, a request to connect client device 202 to access point 208 that is secured by passcode 218 to which server 206 has access. In some examples, a request to connect client device 202 to access point 208 may include a request from client device 202 for passcode 218.

The systems described herein may perform step 302 in a variety of contexts. In one example, request-receiving module 104 may receive a request to connect client device 202 to access point 208 as part of setting up and/or initializing access point 208. In at least one example, client device 202 may represent the first device to attempt to connect to access point 208. In one example, access point 208 may have just been purchased by user 216 of client device 202, and user 216 may be attempting to connect client device 202 to access point 208.

In some examples, access point 208 may be configured to report information about itself to server 206 over Internet 204 when it first comes online. For example, access point 208 may, upon booting up or coming online for the first time, be configured to report its device identifier, Internet Protocol (IP) address, running state, SSID, passcode, and/or any other configuration information to server 206. In response to access point 208 reporting itself to server 206, server 206 may create a record of access point 208 in access points 122 and/or associate the information received from access point 208 with a record of access point 208 in access points 122. Using FIG. 4 as an example, access point 208 may boot up at step 402 and report itself to server 206 at step 404. In response to access point 208 reporting itself to server 206, server 206 may create a record of access point 208 in access points 122 at step 406. Using FIG. 5 as another example, access point 208 may boot up at step 502 and report itself to server 206 at step 504. In response to access point 208 reporting itself to server 206, server 206 may create a record of access point 208 in access points 122 at step 506.

In some examples, management application 224 may be used at client device 202 to send a request for passcode 218 to server 206. In these examples, user 216 may have downloaded management application 224 to client device 202 from server 206 or any other secure web server or application store. In some examples, user 216 may, after installing management application 224 to client device 202, use the application to register a user account at server 206. As will be explained in greater detail below, the systems describe herein may associate the user account of user 216 to access point 208 (e.g., as the owner of access point 208) once the physical proximity of user 216 and/or client device 202 to access point 208 has been verified.

In some examples, user 216 may wait until access point 208 is online (e.g., user 216 may wait until an indicator light of access point 208 indicates that access point 208 is online). User 216 may then use management application 224 to connect to access point 208. In at least one example, management application 224 may begin the process of connecting to access point 208 by first identifying access point 208. In one example, management application 224 may identify access point 208 by scanning for the SSIDs of local access points that are available to connect to. Once management application 224 identifies one or more access points, management application 224 may send a request to server 206 to connect to one of the access points. Using FIG. 4 as an example, management application 224 may, at step 408, begin the process of connecting client device 202 to access point 208 by collecting a list of local access points to which client device 202 may connect. At step 410, management application 224 may send a request to connect to one of the access points contained in the list. At step 412, request-receiving module 104 may receive the request from management application 224. Using FIG. 5 as another example, management application 224 may, at step 508, begin the process of connecting to access point 208 by collecting a list of local access points to which client device 202 may connect. At step 510, management application 224 may send a request to connect to one of the access points contained in the list. At step 512, request-receiving module 105 may receive the request from management application 224.

At step 304, one or more of the systems described herein may transmit a verification-request message from the server to the access point and/or the client device that instructs the access point and/or the client device to perform an action that enables the physical proximity of a user of the client device to the access point to be verified. For example, transmitting module 106 may, as part of server 206 in FIG. 2, transmit verification-request message 228 from server 206 to access point 208 and/or client device 202 that instructs access point 208 and/or client device 202 to perform an action that enables the physical proximity of user 216 to access point 208 to be verified.

As used herein, the term "verification-request message" generally refers to any type or form of electronic message or request that instructs a recipient device to perform an action that enables the physical proximity of a client device or a user of the client device to an access point to be verified. In some examples, a verification-request message may indicate a specific action to perform (e.g., beep four times) or may simply indicate that an action should be performed in response to receiving the verification-request message. The term "physical proximity," as used herein, generally refers to any predetermined range or distance between a client device or user and an access point. In some examples, a client device or a user of the client device may be considered in close physical proximity to an access point if the user is capable of providing input at the access point and/or receiving output from the access point. In certain examples, a client device or a user of the client device may be considered in close physical proximity to an access point if the user is capable of providing physical input (e.g., touch input) at the access point and/or receiving physical output (e.g., visual or auditory output) from the access point.

The systems described herein may perform step 304 in any suitable manner. In some examples, transmitting module 106 may transmit a verification-request message to access point 208 that instructs access point 208 to perform an action that enables the physical proximity of user 216 of client device 202 to access point 208 to be verified. Using FIG. 4 as an example, transmitting module 106 may, at step 413, transmit a verification-request message to access point 208 that instructs access point 208 to perform an action that enables the physical proximity of user 216 of client device 202 to access point 208 to be verified.

In one example, transmitting module 106 may transmit a verification-request message to access point 208 that instructs access point 208 to display an indicator that is visible to user 216. For example, transmitting module 106 may transmit a verification-request message to access point 208 that instructs access point 208 to flash an indicator light one or more times. In another example, transmitting module 106 may transmit a verification-request message to access point 208 that instructs access point 208 to emit a sound that is audible to user 216. For example, transmitting module 106 may transmit a verification-request message to access point 208 that instructs access point 208 to beep one or more times. In response to receiving a verification-request message at access point 208, performing module 112 may perform the action. Using FIG. 4 as an example, performing module 112 may, at step 416, perform an action at access point 208. In response to perceiving the action by access point 208, user 216 may, at step 418, provide input at client device 202 that indicates that user 216 perceived the action.

Additionally or alternatively, transmitting module 106 may transmit a verification-request message to client device 202 that instructs client device 202 to perform an action that enables the physical proximity of user 216 of client device 202 to access point 208 to be verified. Using FIG. 4 as an example, transmitting module 106 may, at step 414, transmit a verification-request message to client device 202 that instructs client device 202 to perform an action that enables the physical proximity of user 216 of client device 202 to access point 208 to be verified. Using FIG. 5 as another example, transmitting module 106 may, at step 514, transmit a verification-request message to client device 202 that instructs client device 202 to perform an action that enables the physical proximity of user 216 of client device 202 to access point 208 to be verified.

In one example, transmitting module 106 may transmit a verification-request message to client device 202 that instructs client device 202 to prompt user 216 to provide input at client device 202 based on an action performed by access point 208. For example, transmitting module 106 may transmit a verification-request message to client device 202 that instructs client device 202 to prompt user 216 for the number of times an indicator light of access point 208 flashed (e.g., "If you see the light flash, input the number of flashes in the keypad or press 0") and/or the number of times access point 208 beeped (e.g., "If you hear the beeps, press the number of beeps in the keypad or press 0"). In response to receiving a verification-request message at client device 202, performing module 112 may perform the action. Using FIG. 4 as an example, performing module 112 may, in response to receiving the verification-request message at step 414, prompt user 216 for input that indicates that user 216 perceived the action performed by access point 208 at step 416. In response to receiving input from user 216, verifying module 114 may, at step 420, transmit a verification-response message from client device 202 to server 206.

In another example, transmitting module 106 may transmit a verification-request message to client device 202 that instructs client device 202 to prompt user 216 to provide input at access point 208. For example, transmitting module 106 may transmit a verification-request message to client device 202 that instructs client device 202 to prompt user 216 to press a button of access point 208. Using FIG. 5 as an example, performing module 112 may, at step 514, prompt user 216 to provide input at access point 208. In response to the prompt, user 216 may, at step 516, provide input at access point 208 that indicates that user 216 received the prompt. In response to receiving input from user 216 at step 518, verifying module 114 may, at step 520, transmit a verification-response message from access point 208 to server 206.

As described above, requests received at step 302 may include the SSID of access point 208. In some examples, transmitting module 106 may use the SSID of access point 208 to look up an Internet address of access point 208 and may then send a verification-request message to the Internet address of access point 208. If the request received at step 302 includes the SSIDs of more than one access point, transmitting module 106 may send a verification-request message to each access point. If the request received at step 302 includes the SSIDs of more than one access point and the request represents a request to setup an access point, transmitting module 106 may determine which access point is a new access point by determining which access point is not yet paired with a user account.

At step 306, one or more of the systems described herein may receive, from the access point and/or the client device at the server, a verification-response message that indicates that the user of the client device has physical access to the access point. For example, message-receiving module 108 may, as part of server 206 in FIG. 2, receive, from access point 208 and/or client device 202, verification-response message 230 that indicates that user 216 has physical access to access point 208.

As used herein, the term "verification-response message" generally refers to any type or form of electronic message or request that indicates whether a user of a client device is in close physical proximity to an access point and/or has physical access to the access point. In some examples, a verification-response message may include input received from a user that indicates that the user perceived an action performed by an access point or may simply indicate that the user perceived the action.

The systems described herein may perform step 306 in any suitable manner. In response to receiving a verification-response message, message-receiving module 108 may verify that the verification-response message indicates that user 216 of client device 202 has physical access to access point 208. In some examples, message-receiving module 108 may validate a verification-response message by ensuring that it was received in a timely manner. For example, message-receiving module 108 may validate a verification-response message by ensuring that it was received within a predetermined amount of time after the verification-request message that triggered the verification-response message was sent.

The systems and methods may perform a number of additional functions in response to receiving a verification-response message that indicates that user 216 of client device 202 has physical access to access point 208. For example, message-receiving module 108 may pair a user account of user 216 with access point 208 such that user 216 can use the user account to (1) request, at an additional client device, passcode 218 from the server without again verifying physical access to the access point and/or (2) perform additional administrative tasks without again verifying physical access to the access point. In some examples, the systems disclosed herein may notify any client device associated with the user account of user 216 whenever the SSID and/or passcode of access point 208 are changed.

In some examples, a verification-response message may include identification information that identifies the client device from which it was sent (e.g., a media access control address of the client device. In these examples, the systems described herein may add the identification information to a list of client devices that are authorized to connect to access point 208. In at least one example, user-account module 116 may use the MAC address of client device 202 to control access to access point 208.

At step 308, one or more of the systems described herein may enable, in response to receiving the verification-response message, the client device to connect to the access point by transmitting, from the server to the client device, the passcode. For example, enabling module 110 may, as part of server 206 in FIG. 2, enable client device 202 to connect to access point 208 by transmitting passcode 218 to client device 202 in response to receiving verification-response message 230.

Figure 5:
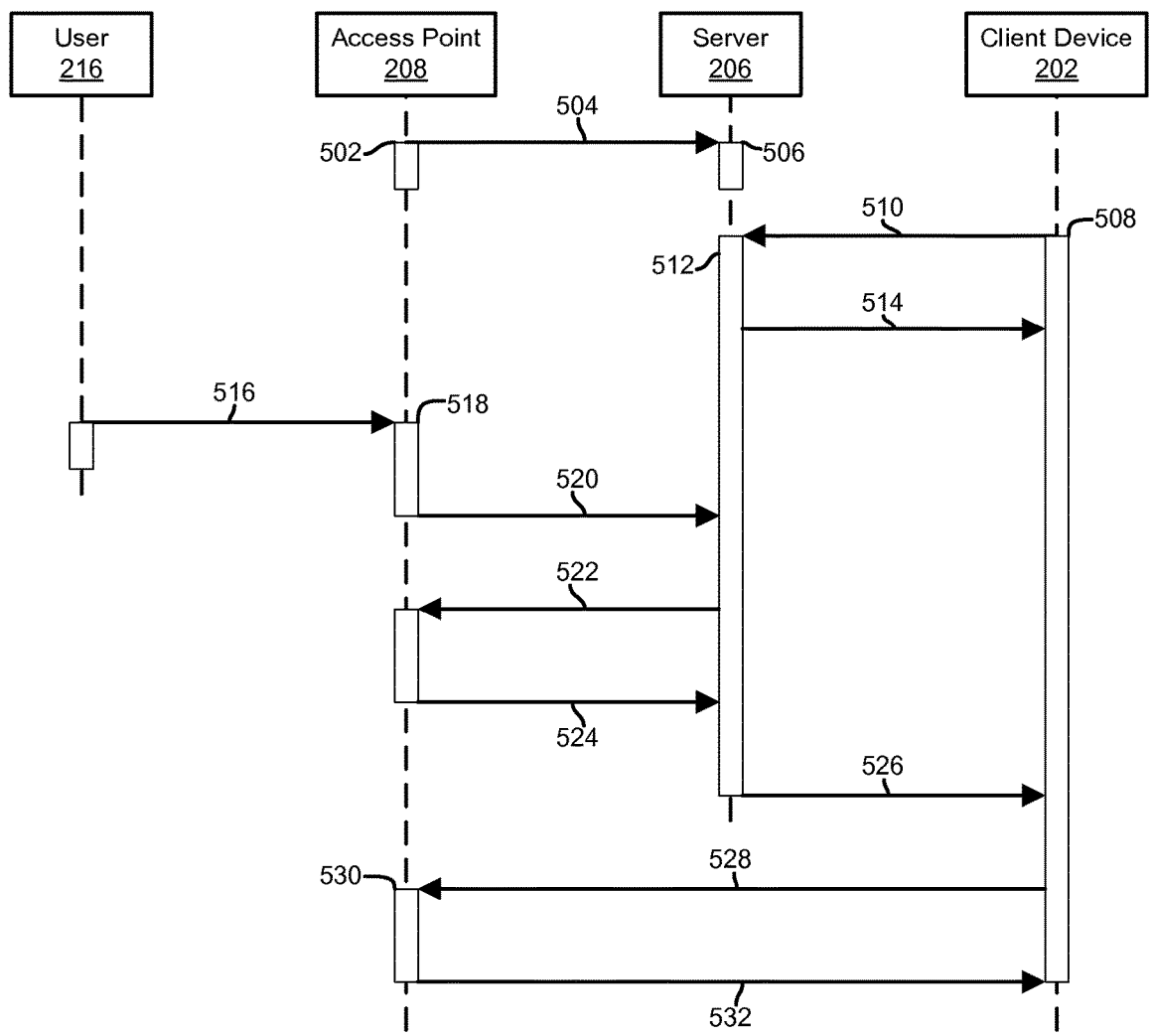
FIG. 5 is a diagram of an additional exemplary sequence for connecting Internet-connected devices to wireless access points.

The systems described herein may perform step 308 in any suitable manner. In one example, enabling module 110 may retrieve passcode 218 from access point 208 and then transmit passcode 218 and/or the SSID of access point 208 to client device 202. Using FIG. 4 as an example, enabling module 110 may, at step 422, send a request to access point 208 for passcode 218. In response to this request, access point 208 may, at step 424, transmit passcode 218 to server 206. Once passcode 218 is received at server 206, enabling module 110 may, at step 426, transmit passcode 218 and/or the SSID of access point 208 to client device 202. Steps 522-526 in FIG. 5 illustrate a similar passcode exchange. In some examples, passcode 218 may be stored at server 206. In these examples, enabling module 110 may transmit passcode 218 to client device 202 without having to retrieve passcode 218 from access point 208.

In response to receiving passcode 218 and/or the SSID of access point 208, management application 224 may connect client device 202 to access point 208 using passcode 218 and the SSID. Using FIG. 4 as an example, management application 224 may, at step 428, send a connection request to access point 208 that includes passcode 218. Access point 208 may, at step 430, validate passcode 218 and, at step 432, respond with a connection acknowledgement. Upon completion of step 308, exemplary method 300 in FIG. 3 may terminate.

Figure 6:
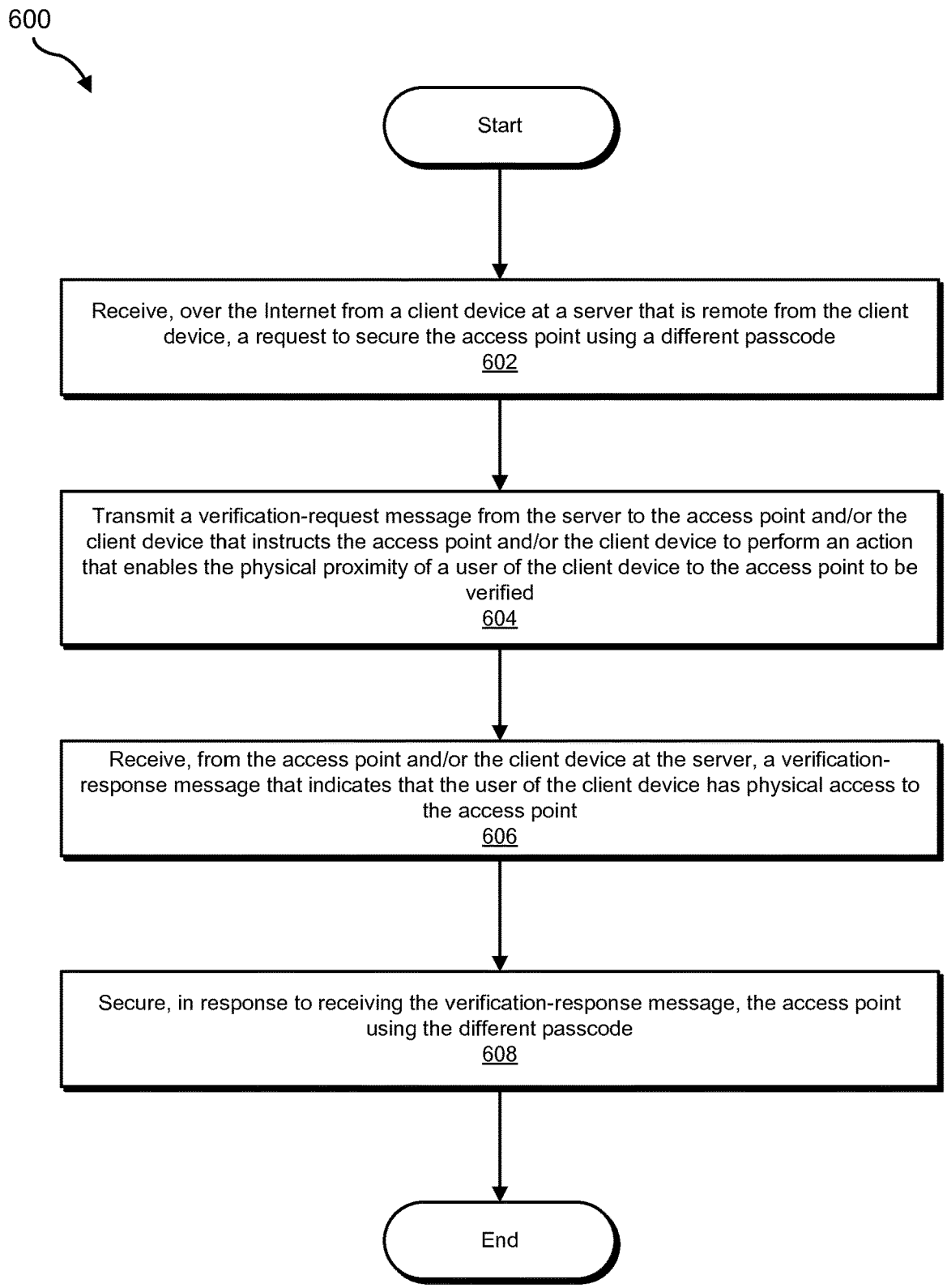
FIG. 6 is a flow diagram of an exemplary method for updating passcodes of wireless access points.
Figure 7:
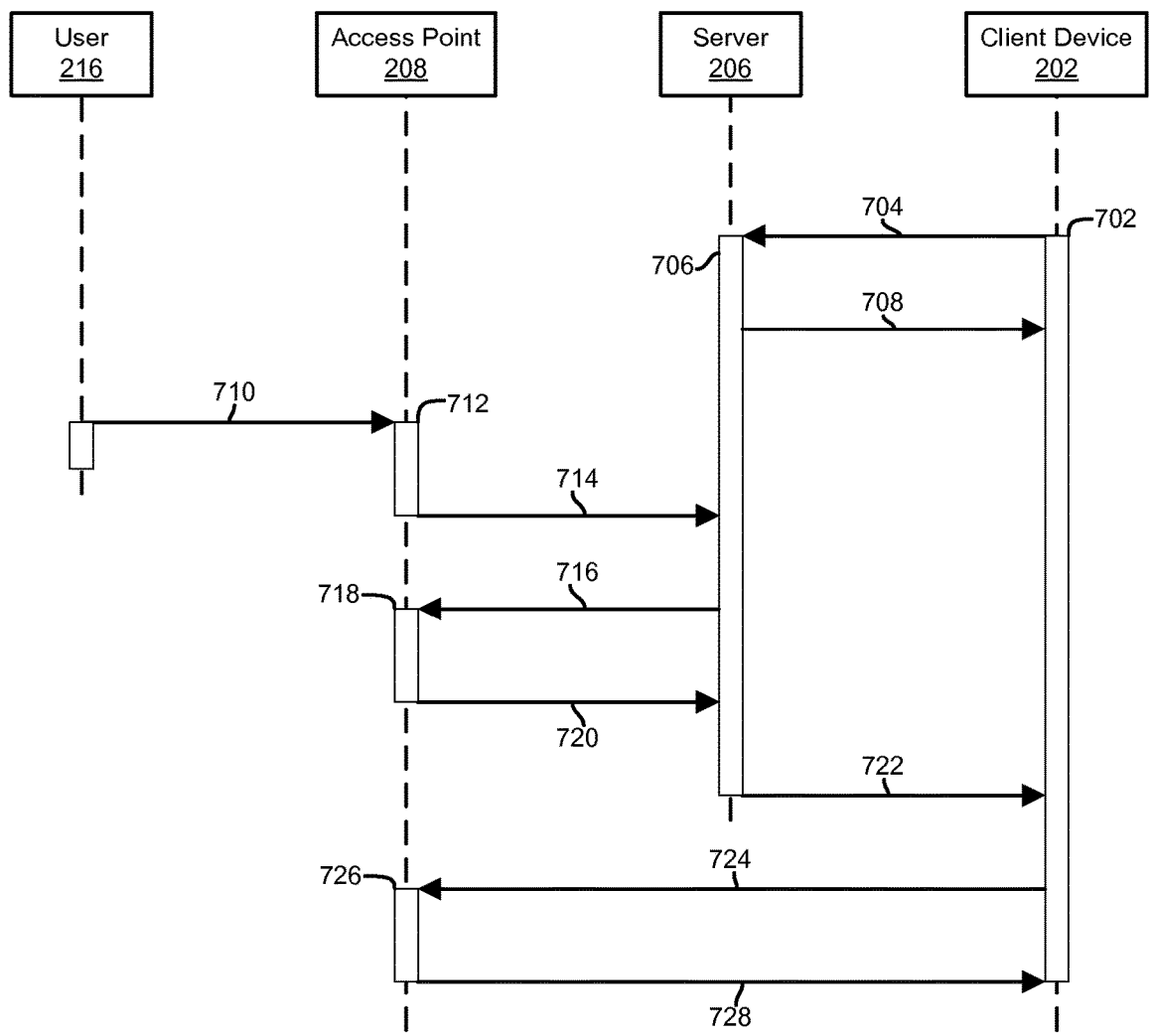
FIG. 7 is a diagram of an exemplary sequence for updating passcodes of wireless access points.

FIG. 6 is a flow diagram of an exemplary computer-implemented method 600 for updating passcodes of wireless access points. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, computing system 810 in FIG. 8, and/or portions of exemplary network architecture 900 in FIG. 9.

As illustrated in FIG. 6, at step 602 one or more of the systems described herein may receive, over the Internet from a client device at a server that is remote from the client device, a request to secure the access point using a different passcode. For example, request-receiving module 104 may, as part of server 206 in FIG. 2, receive, over Internet 204 from client device 202, a request to secure access point 208 using a different passcode. In some examples, a request to secure the access point using a different passcode may include the different passcode.

The systems described herein may perform step 602 in any suitable manner. In some examples, management application 224 may be used at client device 202 to send a request to server 206 to secure access point 208 with a different passcode. In these examples, user 216 may have downloaded management application 224 to client device 202 from server 206 or any other secure web server or application store. In some examples, user 216 may use management application 224 to input a new passcode with which to secure access point 208. In response to receiving the new passcode from user 216, management application 224 may begin the process of replacing passcode 218 of access point 208 with the new passcode by sending a request to server 206 to secure access point 208 with the new passcode. Using FIG. 7 as an example, management application 224 may, at step 702, receive a new passcode from user 216. At step 704, management application 224 may send a request to server 206 to secure access point 208 with the new passcode. At step 706, request-receiving module 104 may receive the request from management application 224.

At step 604, one or more of the systems described herein may transmit a verification-request message from the server to the access point and/or the client device that instructs the access point and/or the client device to perform an action that enables the physical proximity of a user of the client device to the access point to be verified. For example, transmitting module 106 may, as part of server 206 in FIG. 2, transmit verification-request message 228 from server 206 to access point 208 and/or client device 202 that instructs access point 208 and/or client device 202 to perform an action that enables the physical proximity of user 216 to access point 208 to be verified. Step 604 is similar to step 304 in FIG. 3, therefore, the discussion of step 304 may also apply to step 604.

At step 606, one or more of the systems described herein may receive, from the access point and/or the client device at the server, a verification-response message that indicates that the user of the client device has physical access to the access point. For example, message-receiving module 108 may, as part of server 206 in FIG. 2, receive, from access point 208 and/or client device 202, verification-response message 230 that indicates that user 216 has physical access to access point 208. Step 606 is similar to step 306 in FIG. 3, therefore, the discussion of step 306 may also apply to step 606.

At step 608, one or more of the systems described herein may secure, in response to receiving the verification-response message, the access point using the different passcode. For example, enabling module 110 may, as part of server 206 in FIG. 2, secure access point 208 using the passcode received at step 602 in response to receiving verification-response message 230.

The systems described herein may perform step 608 in any suitable manner. In one example, enabling module 110 may transmit the new passcode received at step 602 to access point 208. Using FIG. 7 as an example, enabling module 110 may, at step 716, send a request to access point 208 to replace passcode 218 with the passcode received at step 704. In response to this request, access point 208 may, at step 718, replace passcode 218 with the new passcode.

Once passcode 218 is replaced, access point 208 may, at step 720, send an acknowledgement of the replacement to server 206. In response to receiving the acknowledgment from access point 208, enabling module 110 may, at step 722, transmit an acknowledgement of the replacement to client device 202. In response to receiving the acknowledgement, management application 224 may connect client device 202 to access point 208 using the new passcode. Using FIG. 7 as an example, management application 224 may, at step 724, send a connection request to access point 208 that includes the new passcode. Access point 208 may, at step 726, validate the new passcode and, at step 728, respond with a connection acknowledgement. Upon completion of step 608, exemplary method 600 in FIG. 6 may terminate.

As explained above, by employing a backend server that is connected over the Internet to a client device and a wireless access point via separate communication channels to retrieve and/or modify configuration information at the wireless access point (e.g., passcodes or SSIDs), the systems and methods described herein may enable a user of the client device to securely retrieve and/or change the SSID and passcode of the wireless access point. For example, these systems and methods may enable a user of a smartphone to connect to a backend server over a cellular communication channel to retrieve the passcode of a wireless access point to which the user wishes to connect the smartphone. By using a backend server to provide users with the SSIDs and/or passcodes of wireless access points rather than providing the SSIDs and/or passcodes on the labels of the wireless access points, these systems and methods may enhance the security of the networks hosted by the wireless access points by preventing unauthorized entities from obtaining the SSIDs and passcodes of the wireless access points.

Figure 8:
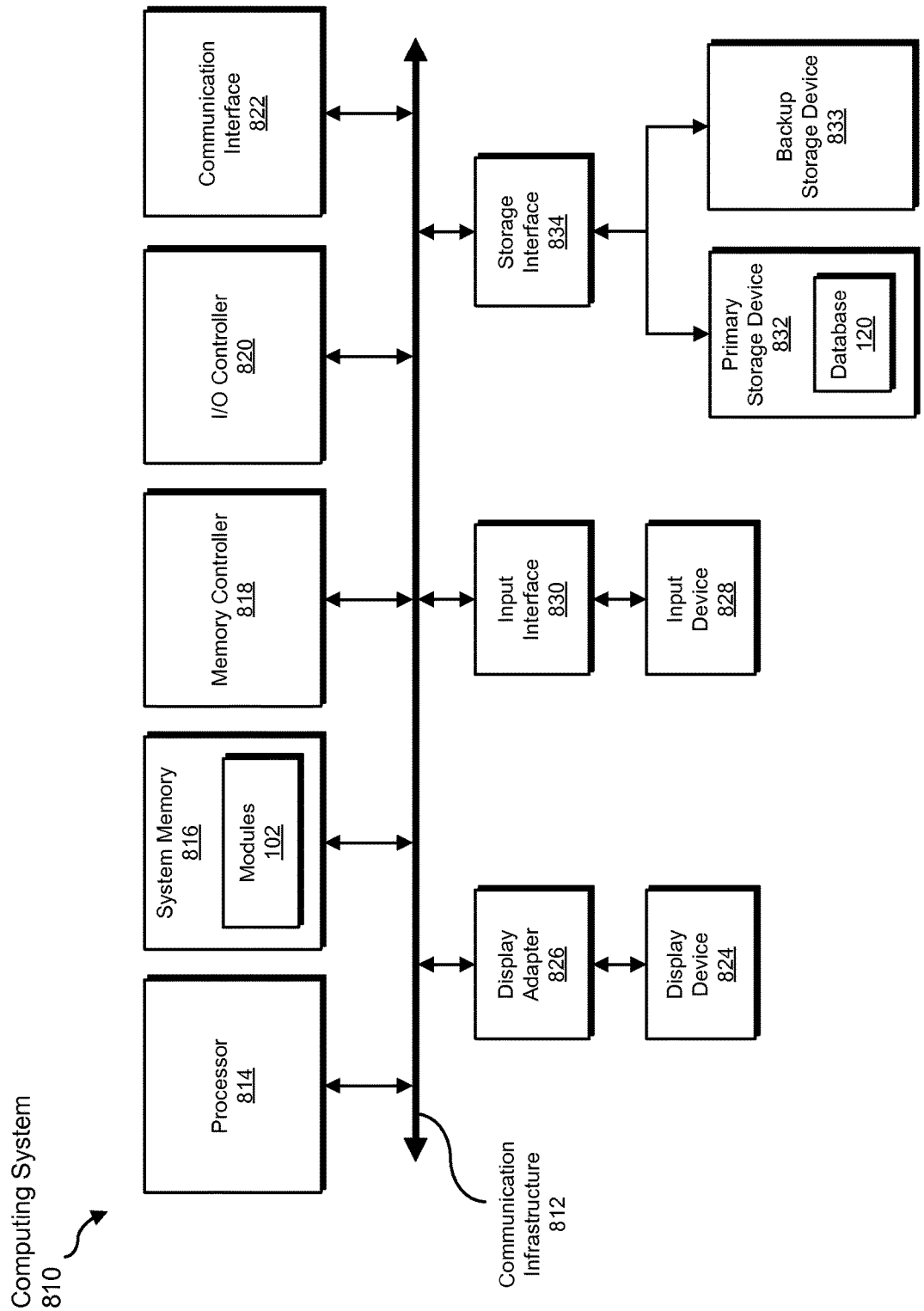
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
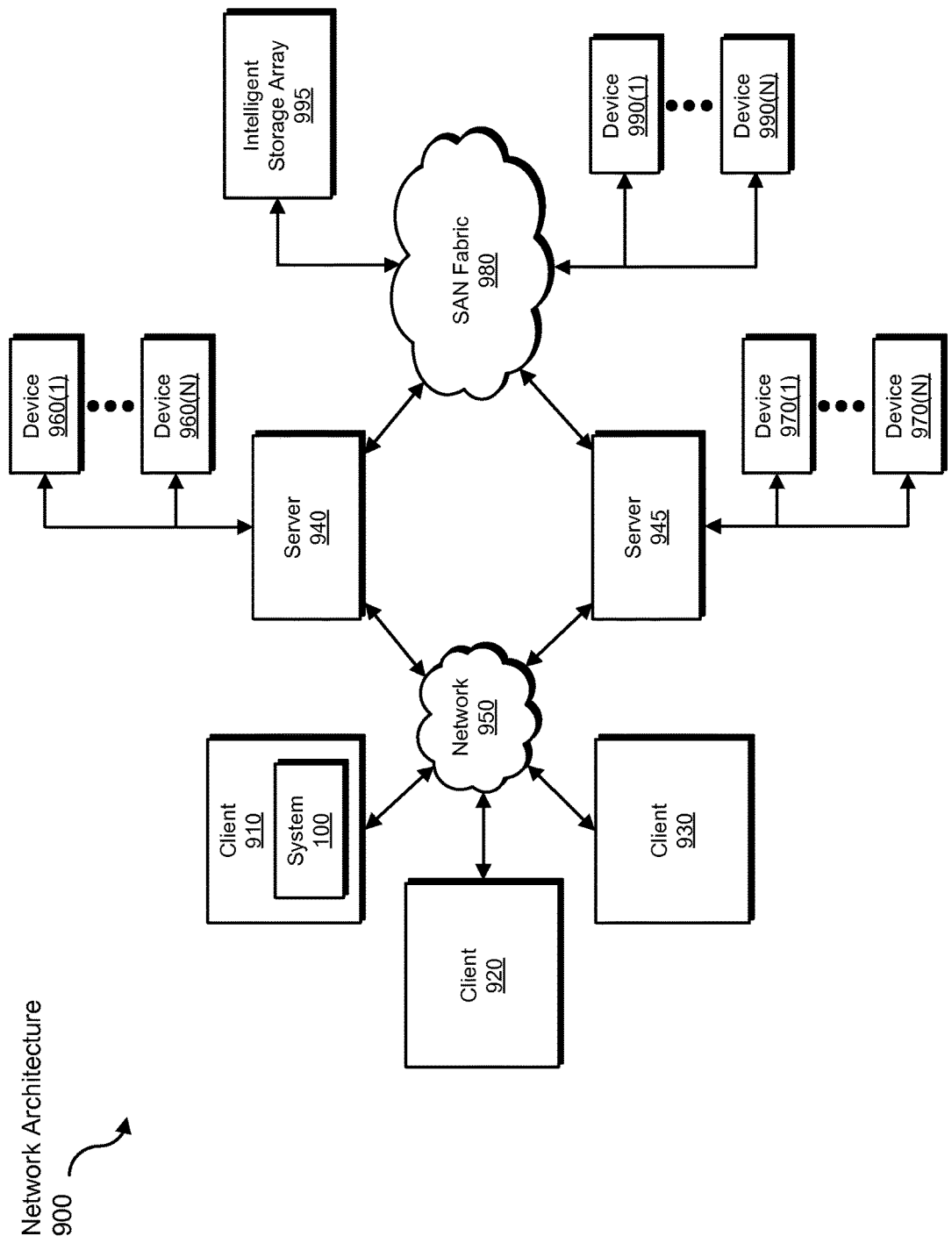
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for connecting Internet-connected devices to wireless access points.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to connect a client device to an access point, transform the request into a verification request, output a result of the transformation to the client device and/or the access point, use the result of the transformation to perform an action at the client device and/or the access point that verifies the proximity of a user of the client device and/or the client device to the access point. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for connecting Internet-connected devices to wireless access points, at least a portion of the method being performed by a computing device comprising at least one processor, the method comprising:

storing, at a server-side system before an access point is purchased by a user, a record of the access point, the record comprising a passcode used to secure the access point;

enabling, via a client-side application executing on a mobile phone, the user to create a user account at the server-side system; and enabling the user to simultaneously connect the mobile phone to the access point using the passcode and verify ownership of the access point by:

identifying, via the client-side application, a plurality of access points local to the mobile phone, wherein the plurality of access points comprises the access point;

transmitting, over a cellular Internet connection of the mobile phone to the server-side system, a request to connect the mobile phone to one of the plurality of access points, wherein the request comprises a list of the plurality of access points;

using, by the server-side system, the list of the plurality of access points to identify the record of the access point;

transmitting, in response to identifying the record of the access point, a verification-request message from the server-side system to the access point that instructs the access point to perform an action that:
         can be experienced by the user; and
         enables the physical proximity of the user to the access point to be verified;

performing, at the access point, the action so that the user can experience the action;

requesting, via a user interface of the client-side application after the action has been performed, the user to describe the action;

receiving, via the user interface after the action has been performed, input directly from the user that:
         describes the action;
         verifies that the user experienced the action; and
         indicates that the user has physical access to the access point;

transmitting, from the mobile phone to the server-side system in response to receiving the input, a verification-response message that:
  indicates that the user provided the input via the user interface; and
  verifies that the user experienced the action and has physical access to the access point;
associating, at the server-side system in response to receiving the verification-response message, the record of the access point with the user account such that the user can use the user account to request, at an additional client-side device, the passcode from the server-side system without again verifying physical access to the access point;
transmitting, in response to receiving the verification-response message, the passcode from the server-side system to the mobile phone; and
using, at the mobile phone, the passcode to connect to the access point.

2. The computer-implemented method of claim 1, further comprising:
receiving, over the Internet from the mobile phone at the server-side system, an additional request to secure the access point using a different passcode;
transmitting an additional verification-request message from the server-side system to the access point that instructs the access point to perform an additional action that:
  can be experienced by the user; and
  enables the physical proximity of the user to the access point to be verified;
receiving, from the mobile phone at the server-side system, an additional verification-response message that indicates that the user has physical access to the access point; and
securing, in response to receiving the additional verification-response message, the access point using the different passcode.

3. The computer-implemented method of claim 1, wherein:
the user interface comprises a keypad; and
the keypad is used by the user to describe the action.

4. The computer-implemented method of claim 1, wherein:
the action comprises displaying, at the access point, an indicator that is visible to the user; and
the input from the user describes the indicator.

5. The computer-implemented method of claim 1, wherein:
the action comprises emitting, from the access point, a sound that is audible to the user; and
the input from the user describes the sound.

6. The computer-implemented method of claim 1, wherein:
the user interface comprises a plurality of buttons;
the action comprises instructing the user to press a particular one of the plurality of buttons; and
the input comprises a button press of the particular one of the plurality of buttons.

7. The computer-implemented method of claim 1, wherein:
the action comprises emitting a sound a specific number of times; and
the input from the user describes the specific number of times the sound was emitted.

8. The computer-implemented method of claim 1, wherein:
the action comprises flashing a light a specific number of times; and
the input from the user describes the specific number of times the light was flashed.

9. The computer-implemented method of claim 1, wherein:
the verification-request message from the server-side system instructs the access point to perform the action a specific number of times;
performing the action comprises performing the action the specific number of times so that the user can experience the action the specific number of times; and
requesting the user to describe the action comprises requesting, via the user interface after the action has been performed, the user to describe the specific number of times the action was performed.

10. A system for connecting Internet-connected devices to wireless access points, the system comprising:
an access point that is secured by a passcode;
a server that stores, before the access point is purchased by a user, a record of the access point and the passcode;
a management application, executing on a mobile phone, that:
  enables the user to create a user account at the server; and
  enables the user to simultaneously connect the mobile phone to the access point using the passcode and verify ownership of the access point by:
    identifying a plurality of access points local to the mobile phone, wherein the plurality of access points comprises the access point; and
    transmitting, over a cellular Internet connection of the mobile phone to the server, a request to connect the mobile phone to one of the plurality of access points, wherein the request comprises a list of the plurality of access points;
a request-receiving module, stored in memory, that receives, at the server over the Internet from the mobile phone, the request;
a transmitting module, stored in memory, that:
  uses, at the server, the list of the plurality of access points to identify the record of the access point; and
  transmits, in response to identifying the record of the access point, a verification-request message from the server to the access point that instructs the access point to perform an action that:
    can be experienced by a user of the mobile phone; and
    enables the physical proximity of the user to the access point to be verified;
a performing module, stored in memory, that performs, at the access point, the action so that the user can experience the action;
a verifying module, stored in memory, that:
  requests, via a user interface of the management application after the action has been performed, the user to describe the action;
  receives, via the user interface after the action has been performed, input directly from the user that:
    describes the action;
    verifies that the user experienced the action; and
    indicates that the user has physical access to the access point; and
  transmits, from the mobile phone to the server in response to receiving the input, a verification-response message that:

indicates that the user provided the input via the user interface; and verifies that the user experienced the action and has physical access to the access point;

a message-receiving module, stored in memory, that receives, at the server from the mobile phone, the verification-response message;

an enabling module, stored in memory, that:

associates, at the server in response to the verification-response message, the record of the access point with the user account such that the user can use the user account to request, at an additional client-side device, the passcode from the server without again verifying physical access to the access point; and transmits, from the server to the mobile phone, the passcode, wherein the management application further uses the passcode to connect the mobile phone to the access point; and at least one processor that executes the request-receiving module, the transmitting module, the message-receiving module, and the enabling module.

11. The system of claim 10, wherein:

the request-receiving module further receives, over the Internet from the mobile phone at the server, an additional request to secure the access point using a different passcode;

the transmitting module further transmits an additional verification-request message from the server to the access point that instructs the access point to perform an additional action that:

can be experienced by the user; and enables the physical proximity of the user to the access point to be verified;

the message-receiving module further receives, from the mobile phone at the server, an additional verification-response message that indicates that the user has physical access to the access point; and the enabling module further secures, in response to receiving the additional verification-response message, the access point using the different passcode.

12. The system of claim 10, wherein:

the user interface comprises a keypad; and the keypad is used by the user to describe the action.

13. The system of claim 12, wherein:

the action comprises displaying an indicator that is visible to the user; and the input from the user describes the indicator.

14. The system of claim 12, wherein:

the action comprises emitting, at the access point, a sound that is audible to the user; and the input from the user describes the sound.

15. The system of claim 10, wherein:

the action comprises flashing a light a specific number of times; and the input from the user describes the specific number of times the light was flashed.

16. The system of claim 10, wherein:

the verification-request message from the server instructs the access point to perform the action a specific number of times;

the performing module performs the action by performing the action the specific number of times so that the user can experience the action the specific number of times; and the verifying module requests the user to describe the action by requesting, via the user interface after the action has been performed, the user to describe the specific number of times the action was performed.

17. A computer-implemented method for connecting Internet-connected devices to wireless access points, at least a portion of the method being performed by a computing device comprising at least one processor, the method comprising:

storing, at a server-side system before an access point is purchased by a user, a record of the access point, the record comprising a passcode used to secure the access point;

enabling, via a client-side application executing on a mobile phone, the user to create a user account at the server-side system; and enabling the user to simultaneously connect the mobile phone to the access point using the passcode and verify ownership of the access point by:

identifying, via the client-side application, a plurality of access points local to the mobile phone, wherein the plurality of access points comprises the access point;

transmitting, over a cellular Internet connection by the mobile phone to the server-side system, a request to connect the mobile phone to one of the plurality of access points, wherein the request comprises a list of the plurality of access points;

using, by the server-side system, the list of the plurality of access points to identify the record of the access point;

transmitting, in response to identifying the record of the access point, a verification-request message from the server-side system to the mobile phone that instructs the mobile phone to perform an action that:

can be experienced by the user; and enables the physical proximity of the user to the access point to be verified;

performing, at the mobile phone, the action so that the user can experience the action;

receiving, via a user interface of the access point after the action has been performed, input directly from the user that:

describes the action;

verifies that the user experienced the action; and indicates that the user has physical access to the access point;

transmitting, from the access point to the server-side system in response to receiving the input, a verification-response message that:

indicates that the user provided the input via the user interface; and verifies that the user experienced the action and has physical access to the access point;

associating, at the server-side system in response to receiving the verification-response message, the record of the access point with the user account such that the user can use the user account to request, at an additional client-side device, the passcode from the server-side system without again verifying physical access to the access point;

transmitting, in response to receiving the verification-response message, the passcode from the server-side system to the mobile phone; and using, at the mobile phone, the passcode to connect to the access point.

18. The computer-implemented method of claim 17, further comprising:

receiving, over the Internet from the mobile phone at the server-side system, an additional request to secure the access point using a different passcode;

transmitting an additional verification-request message from the server-side system to the mobile phone that instructs the mobile phone to perform an additional action that:

can be experienced by the user; and enables the physical proximity of the user to the access point to be verified;

receiving, from the access point at the server-side system, an additional verification-response message that indicates that the user has physical access to the access point; and securing, in response to receiving the additional verification-response message, the access point using the different passcode.

19. The computer-implemented method of claim 17, wherein:

the action comprises instructing the user to press a particular one of a plurality of buttons of the access point a specific number of times; and receiving the input comprises receiving, at the access point, the specific number of button presses.

* * * * *